No. 773,639. PATENTED NOV. 1, 1904.
N. T. HARRINGTON.
VEHICLE FRAME.
APPLICATION FILED JULY 30, 1904.

NO MODEL.

WITNESSES
INVENTOR
NORMAN T. HARRINGTON.
BY
ATTY.

No. 773,639. Patented November 1, 1904.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

VEHICLE-FRAME.

SPECIFICATION forming part of Letters Patent No. 773,639, dated November 1, 1904.

Application filed July 30, 1904. Serial No. 218,823. (No model.)

*To all whom it may concern:*

Be it known that I, NORMAN T. HARRINGTON, a citizen of the United States, residing at Detroit, in the county of Wayne and State of Michigan, have invented certain new and useful Improvements in Vehicle-Frames, of which the following is a specification, reference being had therein to the accompanying drawings.

The invention relates to vehicle-frames, and has more particular reference to motor-vehicles.

It is the object of the invention to obtain a construction combining strength and flexibility; and to this end the invention consists in the construction as hereinafter set forth.

Figure 1:
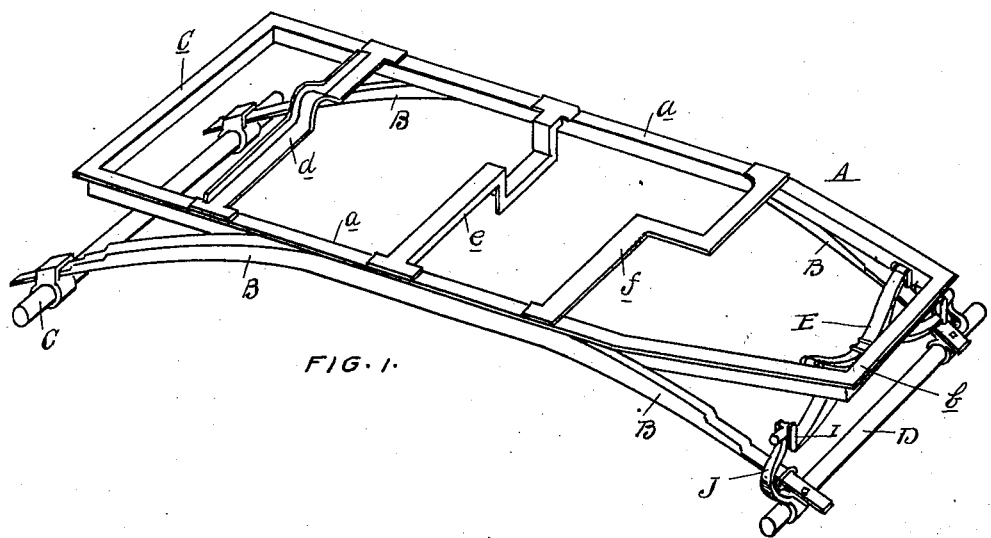
Figure 2:
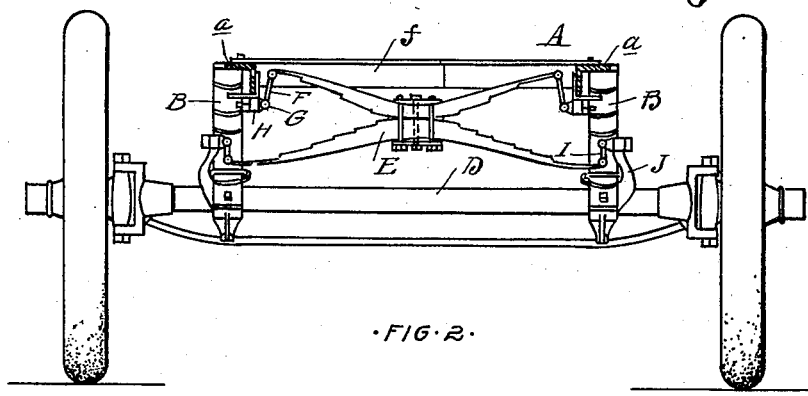
Figure 3:
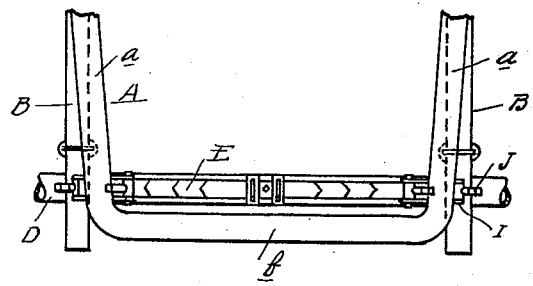

In the drawings, Figure 1 is a perspective view of the frame. Fig. 2 is a front elevation thereof, and Fig. 3 is a plan of the forward portion of the frame.

A is an angular and substantially rectangular frame, preferably formed of angle-bar, comprising the longitudinal side bars $a$ and the forward and rear end bars $b$ and $c$. The frame is preferably strengthened by one or more cross-bars, such as indicated at $d$, $e$, and $f$.

B represents spring-arms which extend longitudinally of the frame in the plane of the side bars $a$ and are attached thereto near the central portion of the frame. These spring-arms incline downward, forward, and rearward and at their outer ends are attached, respectively, to the rear axle C and front axle D.

To strengthen the connection between the ends of the forward spring-arms and the frame A, a cross-spring E is employed, which is preferably in the form of a pair of springs rigidly connected to each other at the center with their ends extending respectively upward and downward. This spring is interposed between the axle D and the forward end of the frame A and serves to assist the spring-arm C in supporting a load upon the frame. The spring-arms C in flexing will cause their outer ends to travel in a path which is substantially an arc drawn from the center or point of attachment between the arms and the frame A. It is therefore apparent if the spring E were rigidly attached to both the spring-arms and to the frame A it would be necessary for it to flex laterally as well as in a vertical plane. This difficulty is avoided by attaching the spring E to the frame and axle, so as to permit of a free lateral swinging movement. As shown, the frame A is provided with depending brackets F, to which links G, connecting with the upper ends of the spring E, are pivotally secured. These pivots are preferably formed by a headed pin H, which is swiveled in the brackets, and is connected by a transverse pivot to the lower ends of the links G. The low arms of the spring E are connected by similar links I with brackets J projecting upward from the axle D and spring-arm B.

With the construction described, whenever a load on the frame A causes the springs to flex the spring E will be simultaneously compressed and swung outward thereby permitting of the free flexing of the spring-arm C. At the same time the spring E serves to reinforce the spring C in supporting the load.

What I claim as my invention is—

1. A spring vehicle-frame comprising a rigid frame, a pair of spring-arms secured to said rigid frame intermediate its ends and projecting downward and outward, a cross-spring interposed between the ends of said spring-arms and said rigid frame, and connections between said cross-spring and said rigid frame and spring-arms respectively, permitting of a lateral swinging when the springs are flexed.

2. In a motor-vehicle a supporting-frame, comprising longitudinal side bars and cross-bars, spring-arms secured to said side bars intermediate their ends and inclined downward, an axle secured to said spring-arms and a transversely-extending spring between said axle and frame pivoted to swing during the flexing of said spring-arms.

3. The combination with a rigid frame of a pair of downward inclining spring-arms, secured to said frame intermediate its ends, an axle secured to the free ends of said spring-arms, a transversely-extending spring E, and links or shanks connecting said spring to said frame and axle.

In testimony whereof I affix my signature in presence of two witnesses.

NORMAN T. HARRINGTON.

Witnesses:
   H. C. SMITH,
   E. D. AULT.